(12) United States Patent
Niggemeyer et al.

(10) Patent No.: US 9,821,624 B2
(45) Date of Patent: Nov. 21, 2017

(54) AXLE ARRANGEMENT WITH MODULARLY FIXABLE AXLE SETTING, AND METHOD FOR THE PRODUCTION THEREOF, AND MOTOR VEHICLE WITH TWIST BEAM AXLE

(71) Applicant: BENTELER Automobiltechnik GmbH, Paderborn (DE)

(72) Inventors: Norbert Niggemeyer, Paderborn (DE); Thomas Henksmeier, Lippstadt (DE); Peter Stastny, Delbrueck (DE); Waldemar Bera, Borchen (DE); Andreas Janzen, Willebadessen-Peckelsheim (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/012,024

(22) Filed: Feb. 1, 2016

(65) Prior Publication Data
US 2016/0221408 A1 Aug. 4, 2016

(30) Foreign Application Priority Data

Feb. 2, 2015 (DE) .......... 10 2015 101 474

(51) Int. Cl.
*B62D 17/00* (2006.01)
*B62D 7/18* (2006.01)
(Continued)

(52) U.S. Cl.
CPC .......... *B60G 21/051* (2013.01); *B60G 7/008* (2013.01); *B62D 7/18* (2013.01); *B62D 17/00* (2013.01); *B60G 3/14* (2013.01); *B60G 3/207* (2013.01); *B60G 11/183* (2013.01); *B60G 2200/17* (2013.01); *B60G 2200/21* (2013.01);
(Continued)

(58) Field of Classification Search
CPC ............. B60G 21/051; B60G 21/05; B60G 2204/148; B60G 2204/1434; B60G 2204/1226; B60G 2200/46; B60G 2200/462; B60G 2200/4622; B60G 2200/464; B60G 2200/21; B60G 2200/22; B60G 2200/31; B60G 2206/50; B60G 2206/8207; B60G 2300/40; B60G 7/008; B60G 11/183; B60G 11/18; B60G 3/207;
(Continued)

(56) References Cited

U.S. PATENT DOCUMENTS

| 6,616,157 B2 * | 9/2003 | Christophliemke ... B60G 7/001 267/273 |
| 2006/0053947 A1 * | 3/2006 | Okamoto ............. B60T 11/046 74/502.6 |

(Continued)

FOREIGN PATENT DOCUMENTS

| DE | 1087462 | 8/1960 |
| DE | 102008062780 | 7/2010 |
| DE | 102010020816 | 11/2011 |
| DE | 102011056390 | 3/2013 |
| FR | 270901 | 9/1994 |
| FR | 2928298 | 9/2009 |
| FR | 2943273 | 9/2010 |
| JP | S61-145011 | 9/1986 |
| JP | 2000025438 | 1/2000 |
| JP | 2000-085330 | 3/2000 |
| JP | 2002012015 | 1/2002 |
| JP | 2002-274134 | 9/2002 |
| JP | 2005119601 | 5/2005 |
| JP | 2007-038875 | 2/2007 |

(Continued)

*Primary Examiner* — Keith J Frisby
(74) *Attorney, Agent, or Firm* — Jacobson Holman, PLLC.

(57) ABSTRACT

An axle arrangement is provided having a wheel carrier with fastening arms. By placement of an assembly opening in the fastening arm in a motor vehicle transverse direction (Y), it is possible to fix the track width with the use of identical parts.

12 Claims, 8 Drawing Sheets

(51) Int. Cl.
  *B60G 21/05* (2006.01)
  *B60G 7/00* (2006.01)
  *B60G 3/14* (2006.01)
  *B60G 11/18* (2006.01)
  *B60G 3/20* (2006.01)

(52) U.S. Cl.
  CPC ...... *B60G 2200/22* (2013.01); *B60G 2200/31* (2013.01); *B60G 2200/46* (2013.01); *B60G 2200/462* (2013.01); *B60G 2202/136* (2013.01); *B60G 2204/148* (2013.01); *B60G 2204/1484* (2013.01); *B60G 2206/20* (2013.01); *B60G 2206/50* (2013.01); *B60G 2206/8207* (2013.01); *B60G 2300/40* (2013.01)

(58) Field of Classification Search
  CPC ............ B60G 3/12; B60G 3/14; B62D 17/00; B62D 7/18
  USPC .... 280/124.137, 124.128, 124.166, 124.106, 280/93.512, 86.75, 86.751
  See application file for complete search history.

(56) References Cited

U.S. PATENT DOCUMENTS

| | | | |
|---|---|---|---|
| 2006/0054424 A1* | 3/2006 | Inoue | B60T 8/52 188/18 R |
| 2010/0098483 A1* | 4/2010 | Toepker | B23K 11/14 403/271 |
| 2011/0285101 A1* | 11/2011 | Henksmeier | B62D 17/00 280/124.11 |
| 2012/0056396 A1* | 3/2012 | Henksmeier | B62D 17/00 280/124.128 |

FOREIGN PATENT DOCUMENTS

| | | |
|---|---|---|
| JP | 2010-018172 | 1/2010 |
| JP | 2012-503570 | 2/2012 |

* cited by examiner

AXLE ARRANGEMENT WITH MODULARLY FIXABLE AXLE SETTING, AND METHOD FOR THE PRODUCTION THEREOF, AND MOTOR VEHICLE WITH TWIST BEAM AXLE

BACKGROUND OF THE INVENTION

1. Field of the Invention

The present invention relates to an axle arrangement for a motor vehicle having a twist beam axle with a torsion tube which connects two outer swing arms, and with wheel carriers which are rigidly coupled to the ends of the swing arms by way of screw connections, the wheel carriers having an integrated wheel bearing for the attachment of a vehicle wheel.

The present invention also relates to a motor vehicle having a twist beam axle with a torsion tube which connects two outer swing arms, and with wheel carriers arranged so as to be coupled to the ends of the swing arms by way of screw connections, the wheel carriers having an integrated wheel bearing for receiving a vehicle wheel.

The present invention also relates to a method for producing an axle arrangement, a twist beam axle being provided, and standardized wheel carriers being provided which have fastening arms directed in a motor vehicle transverse direction.

2. Description of the Prior Art

Different axle types for motor vehicles are known in the prior art. In the simplest embodiment, these are rigid axles which, with the interposition of a spring element, for example a leaf spring, are fastened to a body or to a chassis. More complex axle systems are, for example, multi-link axles with individual wheel suspension.

Also known from the prior art are twist beam axles, which are normally used on a rear axle. A twist beam axle has a torsion tube extending over a part of the width of the motor vehicle, wherein swing arms are fixed, so as to be oriented in a longitudinal direction, to the ends of the torsion tube. Then, in turn, a motor vehicle wheel is coupled, with the interposition of a wheel carrier, to the free end of each swing arm.

A wheel carrier attachment to a rigid axle is known for example from DE 10 2010 020 816 A1.

SUMMARY OF THE PRESENT INVENTION

It is an object of the present invention to further develop a motor vehicle axle such that the components used are reduced, but at the same time, it is made possible for toe and/or camber to be preset, and the motor vehicle axle can be used for different vehicle types.

The above object is achieved with an axle arrangement for a motor vehicle, having a twist beam axle with a torsion tube which connects two outer swing arms, and with wheel carriers which are rigidly coupled to the ends of the swing arms by way of screw connections, the wheel carriers having an integrated wheel bearing for the attachment of a vehicle wheel. According to the present invention, in each case one wheel carrier is coupled to the end of the swing arm by way of at least three screw connections, and each wheel carrier has fastening arms oriented so as to project in the direction of the end of the swing arm, the track width of the axle arrangement being fixed by placement of a receiving opening in the motor vehicle transverse direction (Y) on each fastening arm.

The above object is furthermore achieved by way of a motor vehicle having a twist beam axle with a torsion tube which connects two outer swing arms, and with wheel carriers arranged so as to be coupled to the ends of the swing arms by way of screw connections, the wheel carriers having an integrated wheel bearing for receiving a vehicle wheel. According to the present invention, in each case one wheel carrier is coupled to the end of a swing arm by way of at least three screw connections, and each wheel carrier has wheel carrier arms which project in the motor vehicle longitudinal direction (X), and the end of each swing arm has arms projecting outward in a motor vehicle transverse direction (Y). The wheel carrier is coupled to the swing arm by way of a screw connection which connects the arms and wheel carrier arms, with the wheelbase of the motor vehicle being fixed by placement of a receiving opening in the wheel carrier arms in the motor vehicle longitudinal direction (X) and/or the track width of the axle arrangement being fixed by placement of a receiving opening in the arms in the motor vehicle transverse direction (Y).

The method-related part of the object is furthermore achieved by way of a method for producing an axle arrangement, a twist beam axle being provided, and standardized wheel carriers being provided which have fastening arms directed in a motor vehicle transverse direction. According to the present invention, the method is characterized in that a receiving opening is formed into each fastening arm in a manner dependent on the required track width, and the track width is fixed by way of rigid coupling of the wheel carriers to the twist beam axle.

Advantageous design variants of the axle arrangement for a motor vehicle according to the present invention include 1) the fastening arms additionally extend in the motor vehicle longitudinal direction (X); 2) the wheelbase of the motor vehicle is preset by placement of the receiving opening in the motor vehicle longitudinal direction (X); 3) the fastening arms of the wheel carrier are subjected to mechanical reworking, it being possible for the camber angle ($\beta$) and/or the toe angle ($\alpha$) to be preset by way of the mechanical reworking, such that the camber angle ($\beta$) and/or the toe angle ($\alpha$) can be preset by way of the placement of the receiving openings on the fastening arms of a wheel carrier; 4) the receiving opening is a passage bore or a threaded bore; 5) the fastening arm has a length (L), oriented in the direction of the end of the swing arm, which corresponds to 1.5 times to 5 times the diameter of the receiving opening; 6) the wheel carrier has a receptacle for a brake caliper; 7) the wheel carrier is formed in one piece from one material; 8) the wheel carrier is formed from a steel material or as a cast component; and 9) the wheel bearing is pressed into the wheel carrier, or the wheel carrier is the outer shell of the rolling bodies of the wheel bearing.

The axle arrangement according to the present invention may also be installed in a vehicle platform for the production of different vehicle models with a uniform technical basis.

The axle arrangement for a motor vehicle has a twist beam axle with a torsion tube, which connects two outer swing arms, and with wheel carriers which are coupled to the ends of the swing arms by way of screw connections. Here, each wheel carrier itself has an integrated wheel bearing for receiving a vehicle wheel. According to the invention, the axle arrangement is characterized in that in each case one wheel carrier is coupled to the end of the swing arm by way of at least three screw connections, and each wheel carrier has fastening arms oriented so as to project in the direction of the end of the swing arm, the track width of the axle arrangement being fixed by placement of a receiving opening in the motor vehicle transverse direction on each fastening arm.

According to the invention, therefore, the advantage is achieved that the axle arrangement is formed from substantially three structural elements. These are firstly the twist beam axle itself, which is produced for example as a welded structure composed of torsion tubes and swing arms, and the respective wheel carriers with integrated wheel bearings. The wheel carriers themselves are in this case formed preferably by a main body, which is formed predominantly in the motor vehicle vertical direction and motor vehicle longitudinal direction, with fastening arms which point in the motor vehicle transverse direction from the main body toward the end of the swing arm. It is then preferably the case that the wheel bearing is pressed into said wheel carrier, or alternatively, the wheel carriers themselves also form the outer shell of the wheel bearing. Here, the wheel carriers are preferably produced as cast components, wherein in particular, the bearing receptacle and/or the fastening arms are reworked by way of a mechanical method. In particular, use is made here of a chip-removing cutting method. This likewise offers the further advantage that, by way of the chip-removing cutting method, the target geometry of the kinematic attachment points is adjusted.

It is also conceivable according to the invention for the fastening arms to also extend in a motor vehicle longitudinal direction. It is thus possible, by placement of the receiving opening both in a motor vehicle longitudinal direction and in a motor vehicle transverse direction, to set not only the track width but also the toe angle. Through the selection of the position in the motor vehicle longitudinal direction, it is furthermore possible for the wheelbase to be influenced, and thus increased or reduced by a few millimeters up to a few centimeters, by virtue of the wheel carrier being relocated in the motor vehicle longitudinal direction. It is likewise possible for the camber angle of the wheel to be received to be set through targeted placement of the receiving openings in relation to the motor vehicle vertical direction on upper and lower fastening arms.

It is now provided, in particular in a vehicle platform, that, to realize different track widths, a respective receiving opening is formed in the respective fastening arm of the wheel carrier, this hereinafter also being referred to as positioning or placement. Through positioning of the receiving opening, in relation in particular to the motor vehicle transverse direction, it is possible to set the track width of the axle arrangement. For example, if a respective receiving opening is formed in closer to the wheel carrier-side end of the fastening arm, and the two wheel carriers produced in this way are installed on the twist beam axle, this yields a smaller track width. If the receiving openings are formed in at that end of the fastening arm which points toward the swing arm, and the two wheel carriers are installed on the twist beam axle, this yields a relatively larger track width. Thus, if, for example, a standard-sized car, a minivan and a sedan are constructed on one platform, it is possible by way of the axle arrangement according to the invention for all models of said platform to be equipped with individual track width with the use of identical parts. The wheel carriers are also initially identical in terms of manufacture up until the point at which the receiving opening is formed into the fastening arm. Here, it is then for example the case that the minivan differs from the sedan in that the minivan has a greater track width than the sedan.

The advantage of the axle arrangement according to the invention is that the axle arrangement is constructed exclusively from identical parts, with the only difference being that the positioning of the receiving opening in the manufacturing process is set individually for different vehicle models of the same platform. In this way, the required axle components for the motor vehicle axle itself are reduced, and the production costs of the axle for different models of the same platform are considerably lowered, with the simultaneous realization of a greater degree of design freedom, specifically in the configuration of driving characteristics and/or motor vehicle dynamics by way of different track widths.

The method-related part of the object is furthermore achieved by way of a method for producing the abovementioned axle arrangement. With said method, a twist beam axle and standardized wheel carriers are provided. The wheel carriers may also be referred to as wheel carrier blanks. Then, a required track width is set for the vehicle to be produced. If for example a minivan or an all-terrain vehicle is produced, the track width is greater than that in the case of a small car or a sedan. Then, the receiving openings are positioned and formed on the wheel carrier blanks, in particular into the fastening arms of the wheel carrier blanks, in a manner dependent on the required track width. This may be realized for example by drilling. Subsequently, the wheel carriers thus produced are installed rigidly, in particular rigidly in terms of shear, on the twist beam axle. Thus, an axle arrangement is provided which has a vehicle-specific track width, wherein the axle arrangement is produced from identical parts. It is thus possible according to the invention to dispense with the production of vehicle-specific components. In particular, the blanks or the wheel carrier blanks, or else the twist beam axle as a blank, can be produced as identical parts. The unit costs for the production of said identical parts can thus be minimized.

In particular, the coupling of wheel carriers to the twist beam axle is rigid. This means specifically that no rubber-metal bearing is used. In particular, the coupling is realized by way of a threaded bolt. The set track width is thus fixed. The track width is thus rigidly set.

Insofar as the fastening arms of the wheel carrier are also at least partially oriented in the vehicle longitudinal direction, it is furthermore possible for the toe angle and/or the wheelbase to be fixed by way of the above-described method. In particular, the wheelbase then relates to an installation of the axle arrangement according to the invention on a motor vehicle. In this case, too, the coupling is in turn realized rigidly by way of a threaded bolt after the positioning and production of the receiving opening. Thus, it is possible to specify a means of fixing a vehicle-specific track width and/or toe angle and/or wheelbase by way of identical part blanks.

In an alternative design variant with a motor vehicle having a twist beam axle with a torsion tube, which connects two outer swing arms, and with wheel carriers arranged so as to be coupled to the ends of the swing arms by way of screw connection, the wheel carriers having an integrated wheel bearing for receiving a vehicle wheel, the abovementioned object is achieved in that a wheel carrier is coupled to the end of a swing arm by way of at least three screw connections, and each wheel carrier has arms which project in the motor vehicle longitudinal direction, and the wheel carrier is coupled to the swing arm by way of a screw connection which connects the arms and wheel carrier arms, the wheelbase of the motor vehicle being fixed by placement of a receiving opening in the wheel carrier arms in the motor vehicle longitudinal direction and/or the track width of the axle arrangement being fixed by placement of a receiving opening in the arms in the motor vehicle transverse direction.

With regard to the features explained below, it is possible for the advantageous design variants described with reference to the fastening arms to also be implemented in the case of the arms and wheel carrier arms, for which reason said expressions may be used for example for the placement of the receiving opening and/or the length of the respective arm and/or wheel carrier arm.

The production of the motor vehicle with the twist beam axle also relates to a method for producing the twist beam axle of the motor vehicle, according to which, firstly, the twist beam axles and the wheel carriers are provided. In particular, these are provided as identical parts. It is then in turn possible, by positioning and drilling the receiving openings on the respective arm or wheel carrier arm, for the track width and/or wheelbase and/or the toe angle and/or the camber angle to be fixed on a vehicle-specific basis. The coupling of wheel carrier and twist beam axle is then realized rigidly by way of threaded bolts.

In the alternative design variant of the motor vehicle with the axle arrangement according to the invention, it is thus possible firstly to set the track width but secondly also to simultaneously set the wheelbase in relation to the further vehicle axle situated on the vehicle. In this case, too, it is in turn possible for starting materials to firstly be provided with regard to the twist beam axle with the projecting arms and the wheel carriers with the projecting wheel carrier arms, by the production of identical parts. Through targeted placement of the receiving openings for the formation of the screw connection, it is then made possible for a wheelbase and a track width to be fixed, and, by relative positioning of front and rear or upper and lower receiving openings of each wheel carrier fastening in relation to one another in each case in relation to the direction of travel, for the toe angle and/or the camber angle to also be fixed. By means of this measure, too, it is possible for different vehicle types of a vehicle platform to be equipped with identical parts, such that the production costs of said identical parts are kept low owing to high unit quantities, and the production costs with regard to the placement of the receiving opening and the formation of the screw connections would also be incurred in the case of individual parts. Furthermore, it is possible for production tolerances to be compensated by way of chip-removing cutting machining and/or by way of the targeted placement of the receiving openings such that, in the latter case, chip-removing cutting machining can be partially or entirely omitted.

The formation and/or positioning and/or placement of the respective receiving opening in the fastening arm is performed such that, initially, the fastening arm is of solid form with an extent in particular in the motor vehicle transverse direction and additionally possibly in the motor vehicle longitudinal direction. Then, depending on the required track width, or else toe angle, camber angle and/or wheelbase, the location at which the receiving opening is formed in is selected, and then, the receiving opening is formed in or at the predetermined location on the fastening arm for example by way of a chip-removing cutting process, in particular drilling. The coupling is then realized rigidly, or rigidly in terms of shear. This means that there is no interposition of a rubber-metal bearing.

A further advantage arises owing to the possibility of individual fixing of the toe and/or camber of the vehicle wheel. This may be performed, in the context of the invention, by way of two combined measures or in each case separate measures. Firstly, the mechanical reworking of the fastening arms may be performed such that, for example, the camber is set by way of said mechanical reworking. The attachment points on the end of the swing arm of the twist beam axle are preferably uniform, wherein then, the orientation of the fastening arms, in particular owing to the chip-removing cutting method, makes it possible for the vehicle camber, and to a certain extent also the toe of each wheel, to be preset.

The toe of the vehicle wheel, that is to say the rotation about a motor vehicle vertical direction offset in parallel, may in turn be preset by placement of the receiving opening. If, for example, the receiving opening on a rear fastening arm in relation to the direction of travel is shifted in the direction of the swing arm, this causes the wheel to be rotated in a toe-in direction. Cumbersome readjustment and/or reworking of complex components can thus be omitted in the context of the invention because only the fastening arms and/or the placement of the receiving opening are selected for the pre-setting of toe and/or camber, in particular of the track width.

It is furthermore particularly preferable for the receiving opening to be in the form of a passage bore or in the form of a threaded bore. In the case of the passage bore, the fastening arm would be extended through by a threaded bolt, wherein then, the threaded bolt engages into a thread at a fastening point at the end of the swing arm. In the context of the invention, it is however also possible for the fastening arm of the wheel carrier to be extended through first, and for the threaded bolt to then engage in positively locking fashion into a threaded bore on the fastening arms of the wheel carrier.

It is furthermore particularly preferable for the fastening arm to have a length, oriented in the direction of the end of the swing arm, which corresponds to 1.5 times to 10 times the diameter of the receiving opening.

The fastening arm particularly preferably has a length, oriented in the direction of the end of the swing arm, which corresponds to 1.5 times to 5 times the diameter of the receiving opening. In the case of a diameter of the receiving opening of for example 10 mm, it is thus possible, by way of a fastening arm which is preferably of for example 30 mm in length, for the receiving opening to be shifted on the fastening arm by 20 mm. This variation by fixing of the position of the receiving opening makes it possible for the track width at the axle to be varied by up to 40 mm from a minimum track width to a maximum track width.

It is furthermore particularly preferable for the wheel carrier to have a receptacle for a brake caliper; in this way, it is then in turn possible for a uniform brake system to be used for all vehicles of the platform, such that in turn, the number of identical parts is increased, and thus the production costs of the motor vehicle are reduced.

It is particularly preferable for the wheel carrier itself to be formed in one piece from one material, in particular from a steel material, preferably as a cast component, which is then mechanically reworked.

In the context of the invention, a vehicle platform on which the axle arrangement is preferably installed also includes identical assemblies such as engine, gearbox and the mounting thereof, an identical steering arrangement, gearshift arrangement, pedal assembly, and rear axle, which in accordance with the invention can be modularly adjusted in terms of track width despite the use of identical parts. Furthermore, the vehicle platform preferably comprises a fuel tank, an exhaust system, tires, possibly an entire vehicle front-end, bulkhead, central floor, vehicle rear end, seat frames and possibly also a wiring loom for the individual vehicle electronics components.

BRIEF DESCRIPTION OF THE DRAWINGS

Further advantages, features, characteristics and aspects of the present invention will emerge from the following description. Preferred design variants are discussed in more detail in the schematic figures, as identified below.

Figure 1:
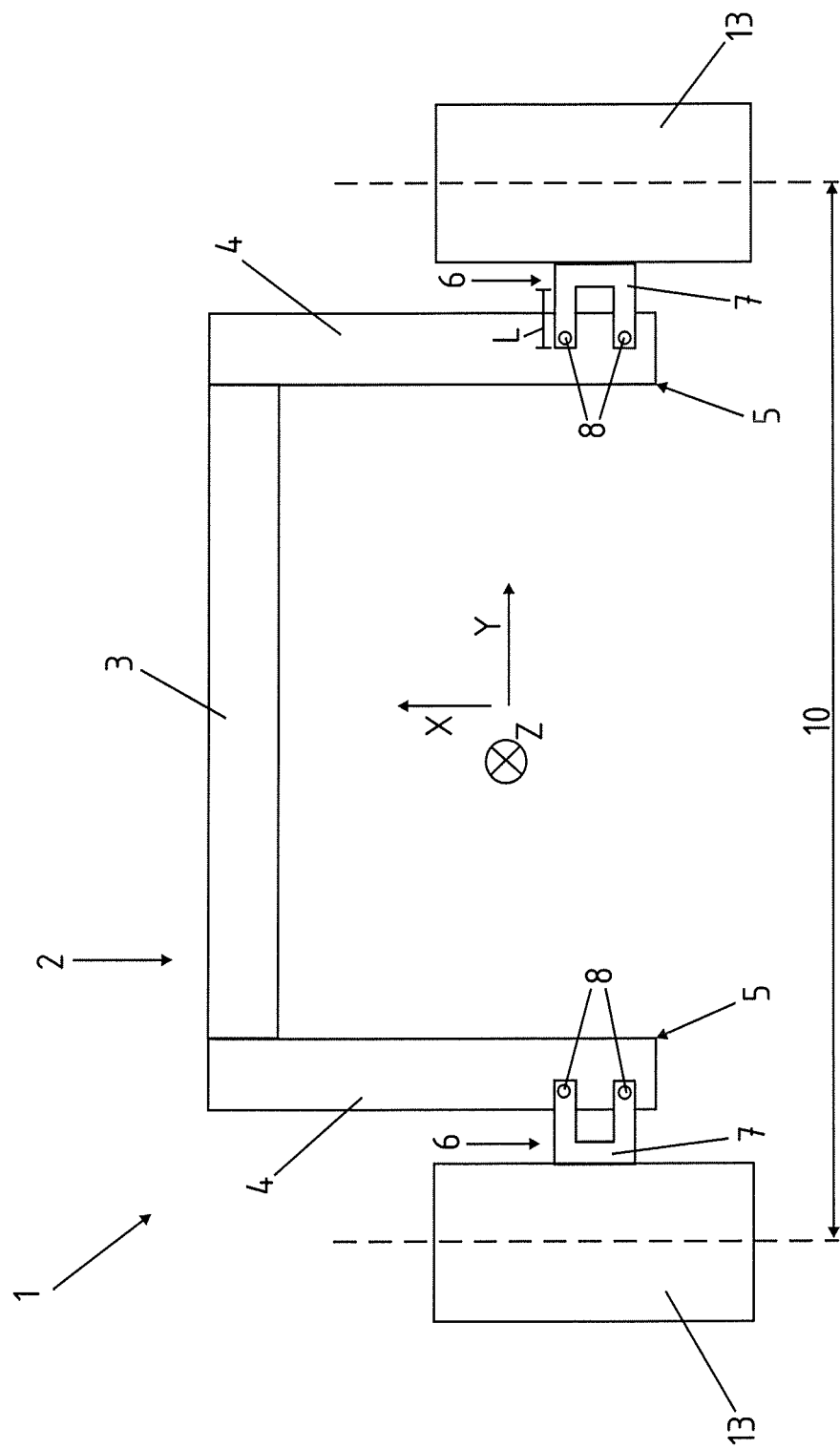
FIG. 1 shows an axle arrangement according to the present invention with set track width.

In the drawing figures, the same reference signs have been used for identical or similar components, even though a repeated description has been omitted for reasons of simplicity.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows the axle arrangement 1 according to the invention with a twist beam axle 2, wherein the twist beam axle 2 has a torsion tube 3 with swing arms 4 arranged on the torsion tube 3. On the end 5 of the swing arms 4 or in the region of the end 5 of the swing arms 4 there is arranged in each case one wheel carrier 6 according to the invention, wherein fastening arms 8 extend in unipartite and materially integral fashion from a main body 7 of the wheel carrier 6 in the direction of the end 5 of the swing arm 4, in particular in the motor vehicle transverse direction Y with a length L.

Figure 2:
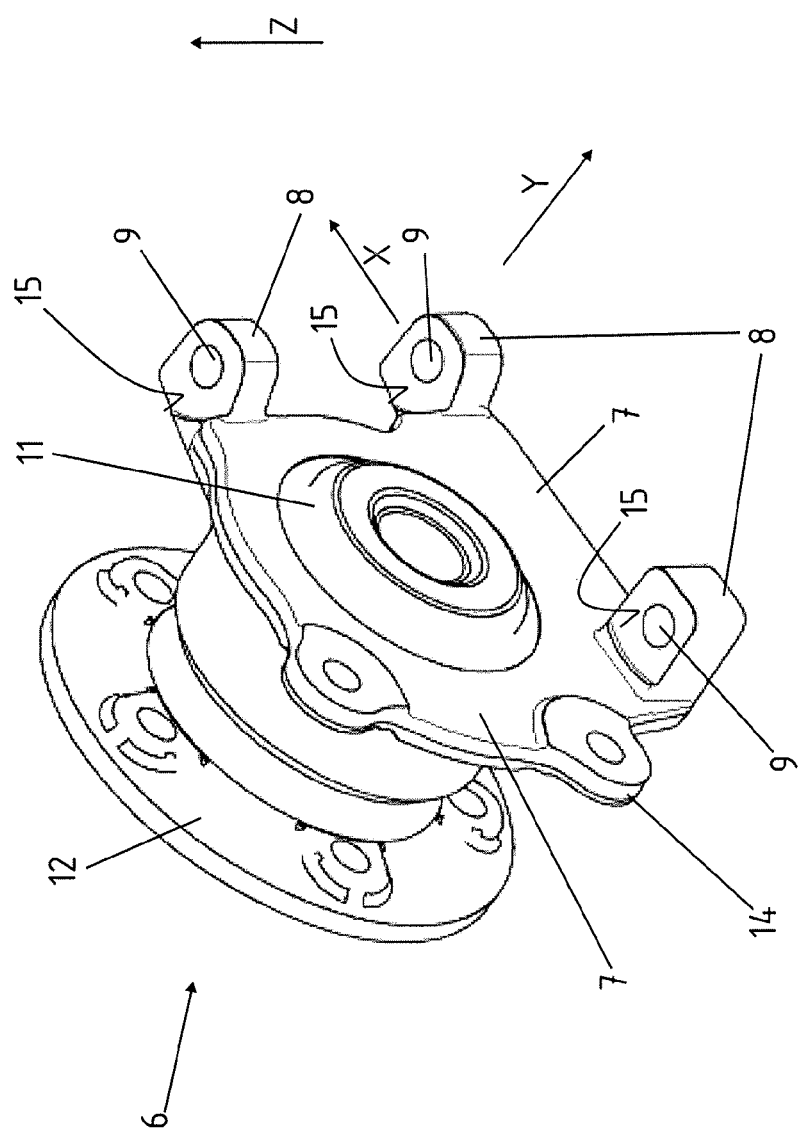
FIG. 2 shows the wheel carrier according to the present invention in a perspective view.

The fastening arms 8 have a receiving opening 9 illustrated in FIG. 2, wherein the track width 10 of the axle arrangement 1 according to the invention can be fixed by placement of the bore for the receiving opening in the motor vehicle transverse direction Y. Consequently, if the receiving opening 9 in the fastening arm 8 is placed further in the direction of the end 5 of the swing arm 4, this causes the wheel carrier 6 to be moved further outward in relation to the motor vehicle transverse direction Y. This yields a greater track width 10.

It is likewise possible to clearly see in FIG. 2 that the wheel bearing 11 is inserted directly into the wheel carrier 6 and has, coupled thereto by way of a shaft not illustrated in any more detail, a wheel flange 12. The wheel 13 itself is then rotatably fastened to the wheel flange 12. It can also be clearly seen in FIG. 2 that a brake caliper holder 14 is formed in unipartite and materially integral fashion on the wheel carrier 6, in particular on the main body 7 of the wheel carrier 6. It can likewise be clearly seen that a surface 15 of each fastening arm 8 has been made plain by way of a chip-removing cutting method. By way of the chip-removing cutting method it is possible both to perform the positioning of the wheel carrier 6 on the end 5 of the swing arm 4 in the motor vehicle vertical direction Z and to compensate production tolerances in the case of the wheel carrier 6 being produced as a cast body. It is also possible to preset the toe and camber of the respective motor vehicle wheel.

Figure 3:
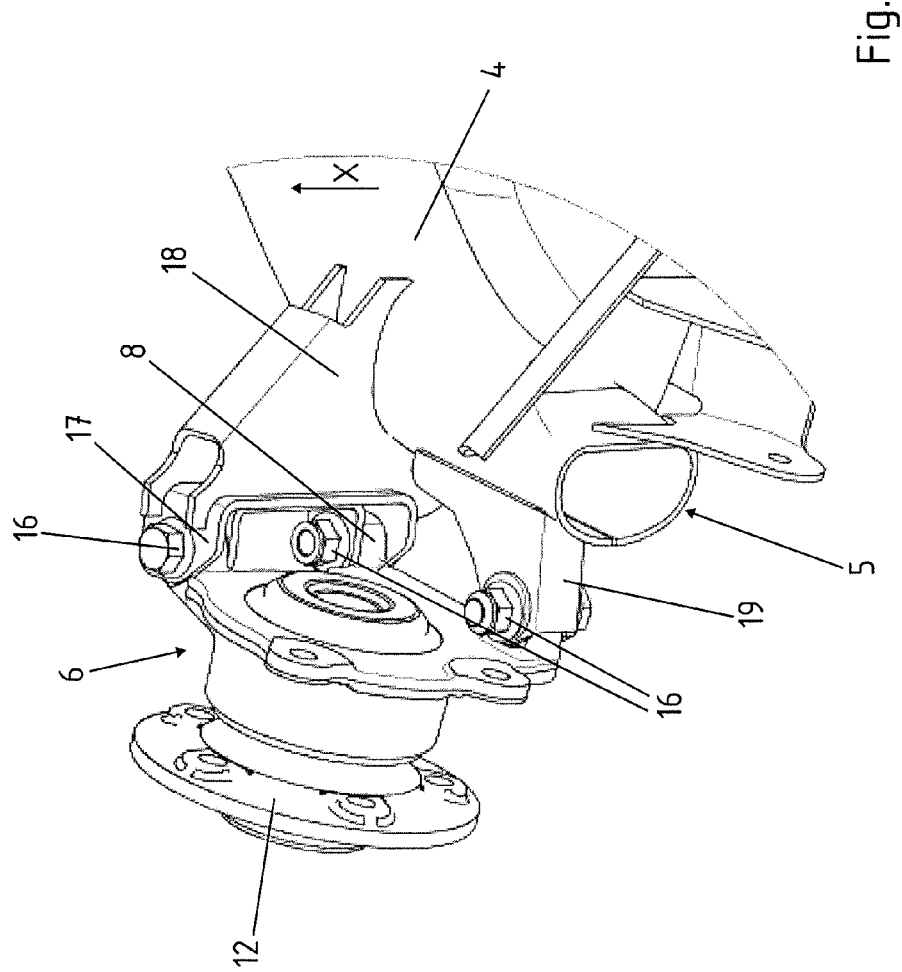
FIG. 3 shows the wheel carrier according to the present invention installed on the end of the swing arm, in a perspective view from the rear.
Figure 4:
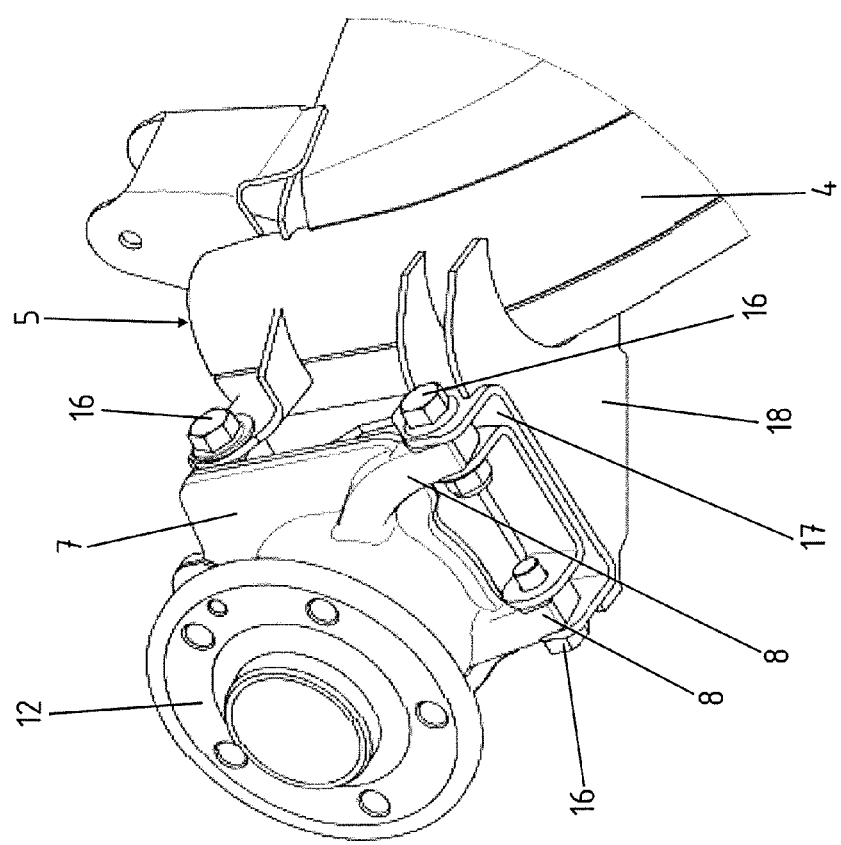
FIG. 4 shows the wheel carrier according to the present invention installed on the end of the swing arm, in a perspective view from the front.

FIGS. 3 and 4 each show the wheel carrier 6 in the installed position on the end 5 of the swing arm 4 of a twist beam axle 2. It can be clearly seen that the wheel carrier 6 is fixed to the receiving points of the swing arm 4 by way of three screw connections 16. As illustrated here, the screw connection extends all the way through the receiving openings 9 of the fastening arms 8. It is also conceivable for the receiving opening 9 to itself be a threaded bore.

The receptacle on the end 5 of the swing arm 4 itself is in the form of a deformed and welded component. To the swing arm 4 itself there is fastened a fork-shaped assembly plate 17 which is coupled by way of a shoulder support 18 to the end 5 of the swing arm 4, wherein it is preferable for all components to be welded to the end 5 of the swing arm 4. A rear fastening point in relation to the motor vehicle longitudinal direction X is likewise coupled, as a deformed component 19 with an extending L-shaped configuration, to the end 5 of the swing arm 4.

Figure 5:
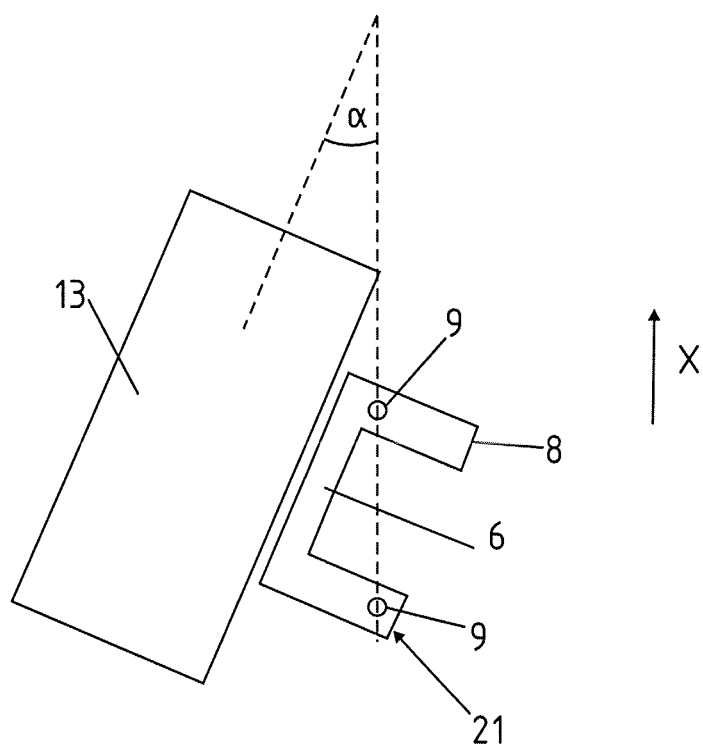
FIG. 5 shows a schematic plan view of a wheel for the setting of a toe angle.

FIG. 5 furthermore shows a wheel carrier 6, in the case of which, in relation to the motor vehicle longitudinal direction X, a front receiving opening 9 in the direction of travel is placed further in the direction of the wheel 13, and a rear receiving opening 9 is placed further in the direction of the free end 21 of the fastening arm 8. The toe angle α can be preset in this way.

Figure 6:
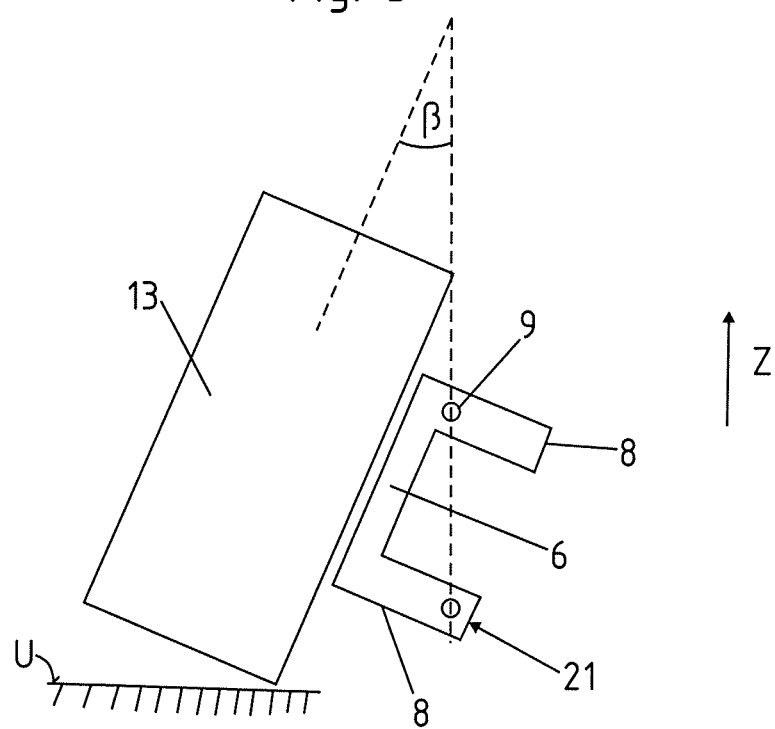
FIG. 6 shows a rear view of a wheel with set camber angle.

FIG. 6 shows a rear view of a wheel 13, on an underlying surface U, with wheel carrier 6 according to the invention, wherein in this case, on the wheel carrier 6, a receiving opening 9 on the upper fastening arm 8 in relation to the motor vehicle vertical direction Z is placed further in the direction of the wheel 13, and a receiving opening on the lower fastening arm 8 is placed further in the direction of the free end 21 of the fastening arm 8. The camber angle β can be set in this way.

Figure 7:
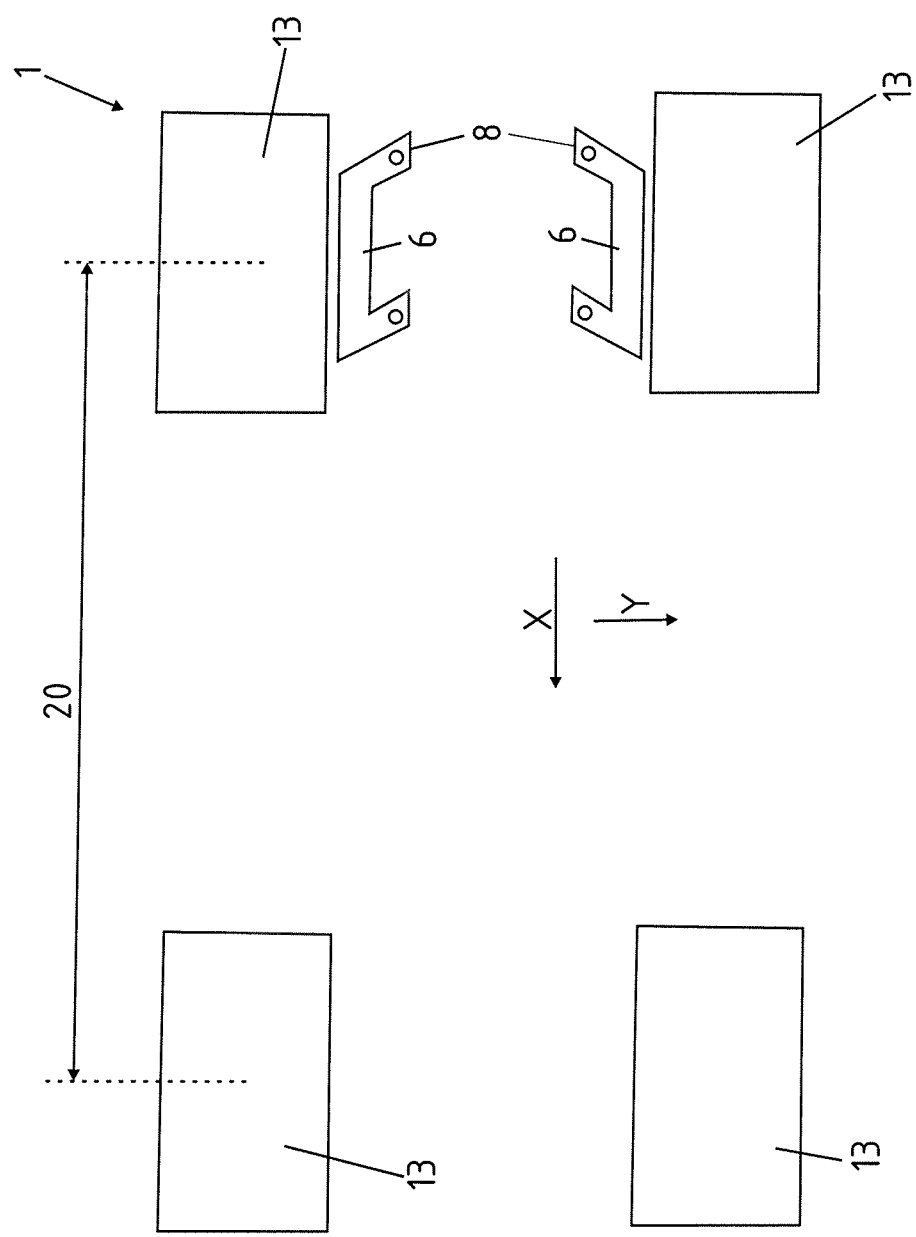
FIG. 7 shows two motor vehicle axles, the wheelbase of which has been set through selection of the placement of the receiving opening.

FIG. 7 shows a schematic plan view of a motor vehicle with four wheels, wherein an axle arrangement 1 according to the present invention is arranged at the rear axle. The axle arrangement 1 has wheel carriers 6, the fastening arms 8 of which extend not only in the motor vehicle transverse direction Y but also additionally in the motor vehicle longitudinal direction X. Through targeted placement of the receiving opening 9 in the motor vehicle longitudinal direction X, it is possible for the wheelbase 20 to be correspondingly preset.

Figure 8:
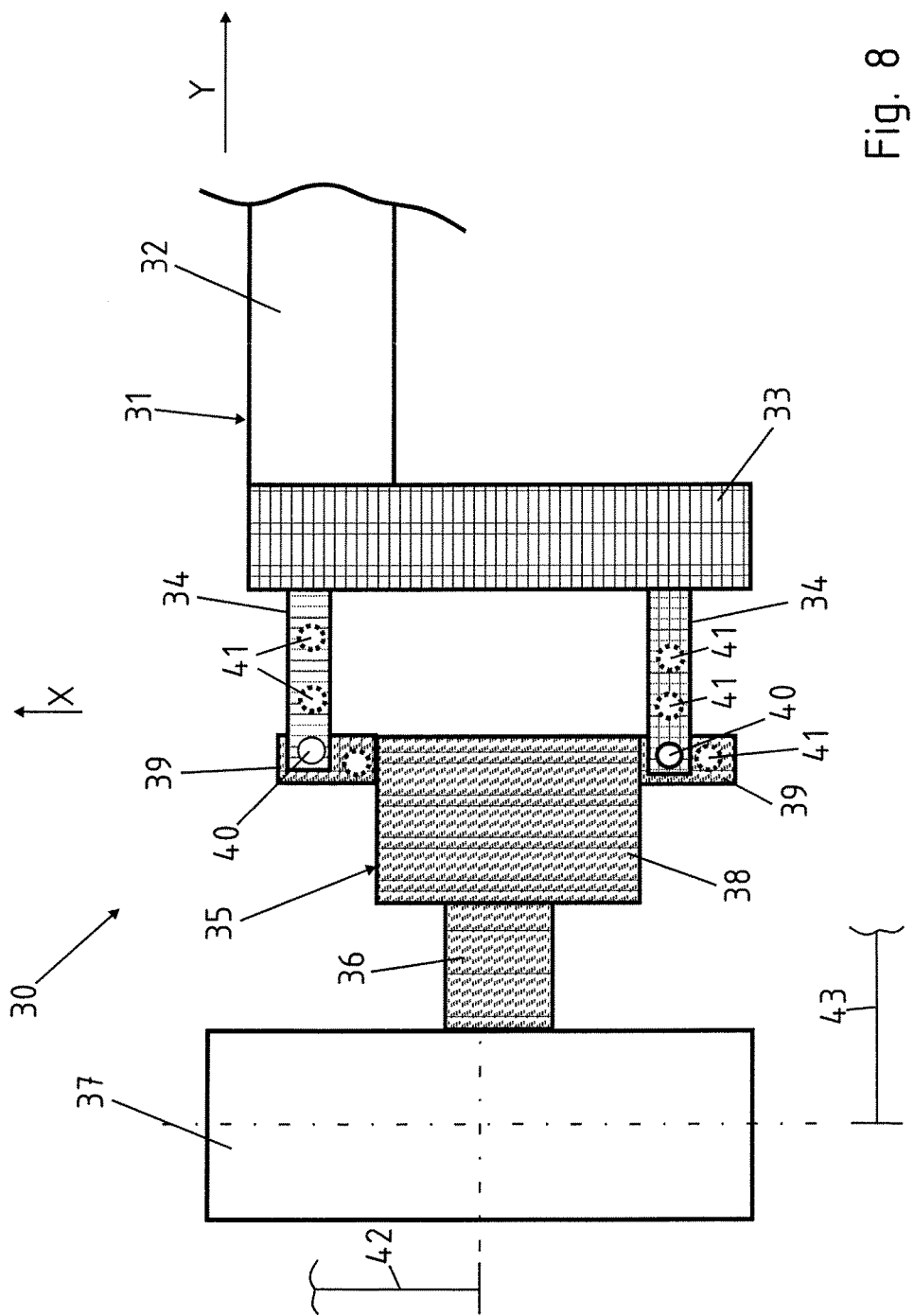
FIG. 8 shows a schematic plan view of a second design variant according to the invention of an axle arrangement.

FIG. 8 shows a second design variant according to the present invention of an axle arrangement 30, wherein in this case too, a twist beam axle 31 is again formed by way of a torsion tube 32 extending in the motor vehicle transverse direction Y and swing arms 33 arranged on the ends of the torsion tube 32. Arms 34 extend from the swing arm 33 in the motor vehicle transverse direction Y, which arms 34, for example as welded structures or deformed sheet-metal components or else as solid components, are coupled to the swing arm 33. Also provided is a wheel carrier 35 with integrated wheel bearings 36, to which wheel carrier a wheel 37 is fastened. Wheel carrier arms 39 project from a main body 38 of the wheel carrier 35 in the motor vehicle longitudinal direction X, wherein the main body 38 of the wheel carrier 35 is in particular in the form of a solid component, very particularly preferably in the form of a cast component and/or forged component, and the wheel carrier arms 39 are formed in unipartite and materially integral fashion thereon. Screw connections 40 are provided, with two screw connections 40 being shown here by way of example, which screw connections couple the arms and the wheel carrier arms 39 to one another. Here, dash-dotted lines indicate the placement of receiving openings 41 on the wheel carrier arms 39 in the motor vehicle longitudinal direction X, giving rise to a wheelbase 42 in relation to a further axle that is not illustrated in any more detail. Also illustrated is the positioning of receiving openings 41 on the arms 34 in the motor vehicle transverse direction Y, such that a track width 43 is set. Furthermore, it is possible, in a manner not illustrated in any more detail, for the camber angle (β) and/or the toe angle (α) to be set by way of the relative positioning of the receiving openings 41 with respect to one another on a wheel carrier 35 and/or on the end of a swing arm 33. Possible placements of the receiving openings 41 are illustrated by dashed lines.

Figure 9B:
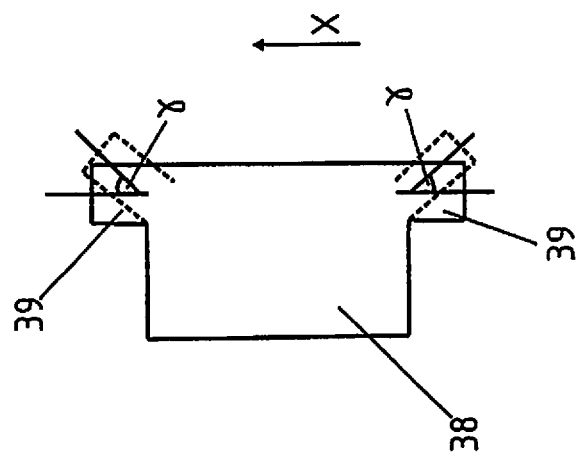
FIG. 9B shows an end of a swing arm with arms projecting at an angle.
Figure 9A:
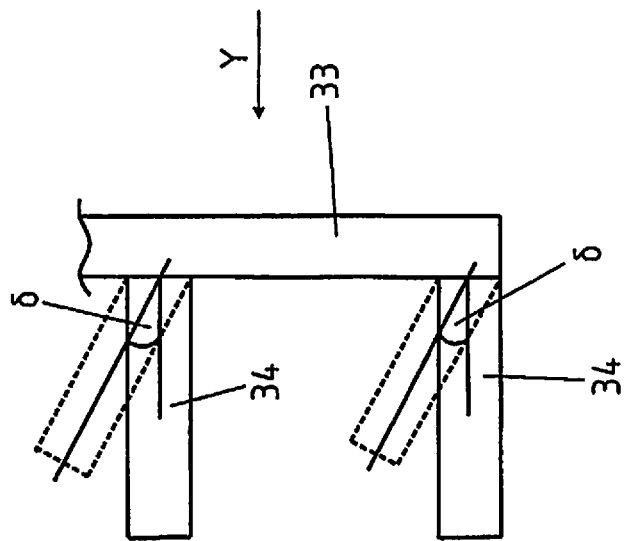
FIG. 9A shows a wheel carrier with wheel carrier arms projecting at an angle.

It is also possible for the wheel carrier arms 39 to additionally be inclined in the motor vehicle transverse direction Y, that is to say to run at an angle γ of preferably 1° to 45° with respect to the motor vehicle longitudinal direction X. The same applies to the arms 34 on the end of the swing arm 33. These may additionally be inclined in the motor vehicle longitudinal direction X, that is to say may run with an angle δ of between 1° and 45° with respect to the motor vehicle transverse direction Y. This is schematically illustrated in FIGS. 9A and 9B.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

REFERENCE DESIGNATIONS

1—Axle arrangement
2—Twist beam axle
3—Torsion tube
4—Swing arm
5—End of 4
6—Wheel carrier
7—Main body of 6
8—Fastening arm of 6
9—Receiving opening
10—Track width
11—Wheel bearing
12—Wheel flange
13—Wheel
14—Brake caliper holder
15—Surface of 8
16—Screw connection
17—Fork-shaped assembly plate
18—Shoulder support
19—Deformed component
20—Wheelbase
21—Free end of 8
30—Axle arrangement
31—Twist beam axle
32—Torsion tube
33—Swing arm
34—Arm
35—Wheel carrier
36—Wheel bearing
37—Wheel
38—Main body of 35
39—Wheel carrier arm of 38
40—Screw connection
41—Receiving opening
42—Wheelbase
43—Track width
L—Length
U—Underlying surface
X—Motor vehicle longitudinal direction
Y—Motor vehicle transverse direction
Z—Motor vehicle vertical direction
α—Toe angle
β—Camber angle

What is claimed is:

1. An axle arrangement for a motor vehicle comprising a twist beam axle with a torsion tube, which connects two outer swing arms, and with wheel carriers which are rigidly coupled to the ends of the swing arms by way of screw connections, the wheel carriers having an integrated wheel bearing for the attachment of a vehicle wheel, one wheel carrier being coupled to the end of the swing arm by way of at least three screw connections, and each wheel carrier having fastening arms oriented so as to project in the direction of the end of the swing arm, the track width of the axle arrangement being fixed by placement of a receiving opening in the motor vehicle transverse direction (Y) on each fastening arm, wherein the wheelbase of the motor vehicle is preset by placement of the receiving opening in the motor vehicle longitudinal direction (X).

2. The axle arrangement as claimed in claim 1, wherein the fastening arms additionally extend in the motor vehicle longitudinal direction (X).

3. The axle arrangement as claimed in claim 1, wherein the fastening arms of the wheel carrier are subjected to mechanical reworking by which the camber angle (β) and/or the toe angle (α) are preset.

4. The axle arrangement as claimed in claim 3, wherein the camber angle (β) and/or the toe angle (α) are preset by way of the placement of the receiving openings on the fastening arms of a wheel carrier.

5. The axle arrangement as claimed in claim 1, wherein the receiving opening is a passage bore or a threaded bore.

6. The axle arrangement as claimed in claim 1, wherein the fastening arm has a length (L), oriented in the direction of the end of the swing arm, which corresponds to 1.5 times to 5 times the diameter of the receiving opening.

7. The axle arrangement as claimed in claim 1, wherein the wheel carrier has a receptacle for a brake caliper.

8. The axle arrangement as claimed in claim 1, wherein the wheel carrier is formed in one piece from one material.

9. The axle arrangement as claimed in claim 8, wherein the wheel carrier is formed from a steel material or as a cast component.

10. The axle arrangement as claimed in claim 1, wherein the wheel bearing is pressed into the wheel carrier.

11. The axle arrangement as claimed in claim 1, wherein the wheel carrier is an outer shell of the wheel bearing.

12. The axle arrangement as claimed in claim 1, wherein the axle arrangement is installed in a vehicle platform for the production of different vehicle models with a uniform technical basis.

* * * * *